UNITED STATES PATENT OFFICE.

EBENEZER KENNARD MITTING, OF CHICAGO, ILLINOIS, ASSIGNOR TO JAMES S. KIRK & CO., OF SAME PLACE, AND ALBERT DOMEIER, OF LONDON, ENGLAND.

PROCESS OF RECOVERING GLYCERINE FROM SPENT SOAP-LYE.

SPECIFICATION forming part of Letters Patent No. 428,510, dated May 20, 1890.

Application filed September 18, 1889. Serial No. 324,348. (Specimens.)

*To all whom it may concern:*

Be it known that I, EBENEZER KENNARD MITTING, a subject of the Queen of Great Britain, residing at Chicago, in the county of Cook and State of Illinois, have invented certain new and useful Improvements in Recovering Glycerine from Spent Soap-Lye, of which the following is a specification.

The object of this invention is to provide an improved process for removing the impurities from spent soap-lye to facilitate the recovery of crude glycerine therefrom. I take the spent soap-lye, and in case it contains an appreciable quantity of alkali worth recovering I first treat it with a small proportion of caustic lime, effecting intimate admixture therewith, and remove the clear liquor from the precipitate. The effect of the lime is to clarify the liquor from some impurities in suspension and solution and to a great extent to causticize the carbonated alkali present. I next concentrate the liquor until it becomes saturated with salts, or nearly so, and then boil it with fat or a fatty acid, which removes most of the free alkali. I next neutralize the remaining alkali with a suitable acid, such as hydrochloric acid. In the case of the spent lye not containing much free alkali I proceed to neutralize it at once with acid, and then concentrate the neutralized liquor until it is saturated with salts, or nearly so. I next take the saturated and neutral liquor produced by either of the foregoing methods and add to and mix with it a small proportion of a solution of cellulose, lignin, tunicin, fibroin, spongin, cutose, or analogous compound or compounds, and then add hydrochloric or other suitable acid until no further precipitate is produced. The proportion of such solution of cellulose or analogous compounds required varies with the character of the spent lyes treated; but ordinarily a proportion of such solution containing from one-twentieth to one-tenth of one per cent. of cellulose or its equivalent, by weight, is sufficient. I filter or settle and filter the clear liquor from the precipitate and neutralize any free acid in the liquor by means of a suitable alkali—such as carbonate of soda or caustic soda—removing any precipitate which may be formed, and then concentrate the clear liquor by boiling to a temperature of about 300° Fahrenheit, removing the salts as formed, and thus produce crude glycerine fit for distillation. The object of the first neutralization with acid and concentration to the point at which the liquor is saturated with salt, or nearly so, is threefold: first, to prevent frothing from presence of soapy matters during the concentration; second, to coagulate and precipitate albuminous impurities, and, third, to bring the liquor into the best physical condition for the next treatment—viz., to a point at which it is saturated with salts, or nearly so. The next step—the addition of acid—has for its object the rendering insoluble of the fatty and resinous acids contained in solution in the liquor with a view to remove them therefrom; but as these bodies are set free in an extremely fine state of division their removal by filtration or otherwise in an expeditious manner, so as to leave the liquor bright, becomes a matter of considerable difficulty. This difficulty is entirely overcome by the addition of a small proportion of a solution of cellulose or its equivalent, as above mentioned. The excess of acid which is necessary for precipitating the fatty and resinous matters also at the same time precipitates the cellulose, (or its equivalent,) and the total precipitated matters collect in clots, curds, or well-defined flocculent particles, leaving the liquor clear and bright, and the removal of such precipitate is thus greatly facilitated.

Solutions of cellulose or its equivalent suitable for my process may be made as follows: (A,) by dissolving cotton in a solution of hydrated oxide of copper in ammonia; (B,) by dissolving silk or wool in the above ammoniacal solution of oxide of copper or in an ammoniacal solution of oxide of nickel; (C,) by dissolving cotton, cork or sponge in caustic potash. I give these as examples and do not confine myself to them, as other solutions of these or closely analogous substances or compounds of them may be made to answer my purpose, and I regard any fibrous flocculent or cellulose substance which may be brought into alkaline or neutral solution and precipitated therefrom by an excess of acid, or any organic substance which can be thus dissolved and precipitated by acid in a flocculent form, as equivalent to the solutions I have specified; or I may make strongly-acid solutions of these substances and use such solutions instead of acid alone to render insoluble the fatty and resinous acids in the spent lye. For instance, I may dissolve cellulose in strong sulphuric acid in the cold. On adding a small proportion of this solution to the spent soap-lye the fatty and resinous acids are rendered insoluble, while at the same time the cellulose (modified in some respects, however, through the action of the acid) is set free in flocculent form by dilution, and thus the same end is accomplished, as has been above cited in the case of using a solution of cellulose and acid in separate form. The solution of cellulose or its equivalent and the quantity of acid necessary to precipitate the fatty and resinous acids may be added directly to the spent lye without intermediate evaporation or the spent lye may be treated with lime and evaporated to "salting-point," or nearly so, and then at once treated with the solution and excess of acid without the intermediate removal of the free alkali therefrom, and in such case the albuminous bodies are not usually fully precipitated until the liquor is neutralized with alkali previous to final concentration. By these orders of working the same ultimate result is obtained, but in a less convenient manner, as will be readily understood, and by preference I operate upon the neutral and salting-point lye by first adding to and mixing with it a small proportion of the solution of cotton in an ammoniacal solution of oxide of copper, and then add sufficient free acid until no further precipitate is produced. Then remove the clear liquor from the precipitate and neutralize the free acid with an alkali and concentrate the neutral liquor, as above described. Any excess of metallic impurities may be precipitated by caustic alkali, and the small excess of this latter neutralized by acid before the final concentration, if necessary. In the case of using simple solutions of cellulose or its equivalent in strong acid or caustic alkali, such metallic impurities will of course not be met with.

I claim—

1. In the recovery of glycerine and salt from spent soap-lye, the improvement which consists in adding thereto some solution of cellulose, cutose, or equivalent organic substance, and an excess of acid, thereby to precipitate and collect the fatty and resinous impurities and removing the precipitated impurities from the clear liquor, substantially as described.

2. In the recovery of glycerine and salt from spent soap-lye, the improvement which consists in adding thereto some solution of cellulose, cutose, or equivalent organic substance, and an excess of acid, then removing the precipitated impurities from the clear liquor, next adding an alkali thereto, and concentrating, substantially as described.

3. In the recovery of glycerine and salt from spent soap-lye, the improvement which consists in first neutralizing the lye with acid and concentrating it until it is saturated or nearly saturated with salts, and then adding some solution of cellulose, cutose, or equivalent organic substance, and an excess of acid, and removing the precipitated impurities from the clear liquor, substantially as described.

4. In the recovery of glycerine and salt from spent soap-lye, the improvement which consists in first neutralizing the lye with acid and concentrating it until it is saturated or nearly saturated with salts, and then adding some solution of cellulose, cutose, or equivalent organic substance, and an excess of acid, and removing the precipated impurities, and then adding an alkali and concentrating, substantially as described.

EBENEZER KENNARD MITTING.

Witnesses:
N. H. BOND,
FREDERICK C. GOODWIN.